United States Patent [19]

Sakato et al.

[11] 4,363,836
[45] Dec. 14, 1982

[54] PRIMING COMPOSITIONS FOR A BASE OF CEMENT MORTAR OR CONCRETE

[75] Inventors: Naoyuki Sakato, Urawa; Norio Nakamura, Omiya, both of Japan

[73] Assignee: Shin-Etsu Chemical Co., Ltd., Tokyo, Japan

[21] Appl. No.: 234,555

[22] Filed: Feb. 13, 1981

[30] Foreign Application Priority Data

Feb. 23, 1980 [JP] Japan ................................. 55-22076
Feb. 29, 1980 [JP] Japan ................................. 55-24744

[51] Int. Cl.$^3$ .............................................. B05D 3/02
[52] U.S. Cl. .............................. 427/393.6; 427/407.1; 428/341; 428/500; 428/540; 525/60; 525/61
[58] Field of Search .................... 427/393.6, 407.1; 428/341, 540, 688, 500; 525/60, 61

[56] References Cited

U.S. PATENT DOCUMENTS 4,169,088 9/1979 Hansen ....................... 427/393.6 X

FOREIGN PATENT DOCUMENTS 49-31529 8/1974 Japan ................................. 427/393.6

*Primary Examiner*—Michael R. Lusignan
*Attorney, Agent, or Firm*—Toren, McGeady & Stanger

[57] ABSTRACT

The invention provides an improved method for priming the surface of a cement mortar or concrete base whereby the adhesive bonding strength of the overcoat finishing with a cement mortar or paste as well as the waterproofing effect of the overcoat layer can be greatly improved by use of a novel aqueous priming composition. The priming composition contains, as an essential ingredient as dissolved in an aqueous medium, a modified polyvinyl alcohol characteristic in the side chains etherified with long-chain alkyl groups such as lauryl and stearyl in a limited mole fraction. The priming composition may also contain an emulsion of a synthetic resin mainly composed of vinyl acetate. The effectiveness of the modified polyvinyl alcohol is so outstanding that the inventive priming composition may contain only 1% by weight or more of the modified polyvinyl alcohol based on the total solid content, the balance being the synthetic resin dispersed as the emulsion.

3 Claims, No Drawings

PRIMING COMPOSITIONS FOR A BASE OF CEMENT MORTAR OR CONCRETE

BACKGROUND OF THE INVENTION

The present invention relates to a priming composition for a base of cement mortar or concrete or, more particularly, to a priming composition used for improving the adhesion between the surface of a base cast with a cement mortar or concrete and a finishing overcoat layer formed with a cement paste or cement mortar as well as for increasing the water-proofing effect of the overcoat layer.

In the architectural techniques, it is very common that the surface of a concrete-made building or the like is finished by providing a finishing overcoat layer of a cement paste or cement mortar on the more or less rugged surface of a base body made of concrete not only in the case where the concrete body is built by in-place casting but also in the case where the body is constructed with precast concrete members. When the finishing overcoat is directly provided on the surface of the concrete base, a problem is sometimes unavoidable that the adhesion between the surface of the base and the overcoat layer is insufficient and the overcoat layer eventually exfoliates and comes off in the long run. This problem is more serious when the surface of the base is relatively smooth or the overcoating is worked on the base surface as dried. In addition, the finishing overcoat layer is susceptible to water permeation and water-proofing effect can hardly be expected, especially, when fissures are formed in the overcoat layer.

As a remedy for the above mentioned defects in the finishing overcoat with a cement mortar, there have been proposed and widely practiced priming methods by applying a priming composition to the surface of the concrete base or by admixing a modifying agent with the cement mortar for the finishing overcoat. These methods are effective to their own extents but cannot be free from several problems on the other hand. Conventional priming compositions include aqueous emulsions of polyvinyl acetate, copolymers of vinyl acetate and ethylene, copolymers of acrylic acid esters and styrene and the like as well as aqueous solutions of polyvinyl alcohol. Modifying agents to be admixed in the cement mortar for overcoat include aqueous emulsions of a copolymer of vinyl acetate and ethylene, latices of synthetic rubbers and the like.

The problems or drawbacks inevitably involved in the above mentioned methods are as follows. For example, the latter method of admixing a modifying agent into the cement mortar for finishing overcoat can exhibit satisfactory effectiveness only by the incorporation of a considerably large amount of the relatively expensive resinous or rubbery constituent in the cement mortar. Further, the aqueous emulsion used as a priming composition in the former method sometimes suffers from instability in the coating and drying steps on the base surface so that no uniform coating film having sufficient priming effect is obtained unless an excessively large amount of the emulsion is applied to an extent of 1.5 to 3 times larger than the amount expectedly sufficient when an evenly spread coating film is formed on the base surface. In addition, the waterproofing effect obtained with such a coating film formed with the emulsion is not always sufficiently high as is expected. The polyvinyl alcohol, which is used as an aqueous solution, is almost ineffective in waterproofing not only due to the hydrophilic nature of the polymer but also due to the low consistency of the polymer swollen with water. When an improved waterproofing effect is desired, a waterproof agent may be admixed with the aqueous solution of the polyvinyl alcohol. A serious problem in this case is that the priming effect of the polyvinyl alcohol is greatly reduced because water-proof agents are generally hydrophobic.

SUMMARY OF THE INVENTION

An object of the present invention is to provide a novel method for priming on the surface of a base formed with a cement mortar or concrete effectively and economically to increase the adhesion of the finishing overcoat of cement paste or mortar to the base surface as well as to improve the waterproofing effect of the finishing overcoat.

Another object of the invention is to provide a novel and improved priming composition suitable for practicing the above mentioned priming method without the problems and drawbacks in the prior art compositions.

The priming composition of the invention comprises, as dissolved in water, a modified polyvinyl alcohol containing, in the molecular chain thereof, monomer units expressed by the formulas:

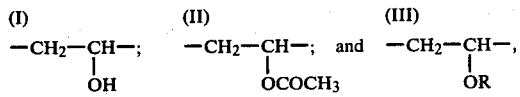

in mole fractions x, y and z, respectively, where R is an alkyl group having at least 6 carbon atoms, x is a positive number not smaller than 0.60, y is a positive number of 0.40 or smaller and z is a number in the range from 0.0001 to 0.02 inclusive with the proviso that $x+y+z$ is substantially equal to 1. Each of the molecules of the modified polyvinyl alcohol should preferably contain at least one etherified monomer unit represented by the formula (III) above.

Although the essential component in the inventive priming composition is the above defined modified polyvinyl alcohol, the inventive priming composition may comprise an aqueous emulsion of a synthetic resin such as a polyvinyl acetate emulsion in combination with the above defined modified polyvinyl alcohol. With respect to the blending ratio of the modified polyvinyl alcohol and the synthetic resin emulsion, the amount of the latter can be so large as up to 100 times by weight as solid of the former component by virtue of the outstanding effectiveness of the modified polyvinyl alcohol in the priming and waterproofing effects.

DETAILED DESCRIPTION OF THE PREFERRED EMBODIMENTS

As is described in the above, the essential component in the inventive priming composition is the modified polyvinyl alcohol composed of the three kinds of the monomer units given by the formulas given above although the monomer units expressed by the formula (II) are not essential.

The modified polyvinyl alcohol used in the invention contains a limited amount of the etherified side chains as expressed by the formula (III) in which the alkyl group denoted by R has at least 6 carbon atoms. Owing to the hydrophobic nature of these long-chain alkyl groups, the modified polyvinyl alcohol is less affinitive to water than ordinary polyvinyl alcohols and a higher viscosity or consistency is obtained when dissolved in or swollen with water to give a high waterproofing effect by the synergism thereof. In contrast, ordinary polyvinyl alcohols are highly affinitive to water and give an aqueous solution of a relatively low viscosity. Therefore, such an aqueous solution is rapidly absorbed in a large volume into the highly water-absorptive surface of the concrete or mortar base to give extreme difficulties in providing uniform coating on the surface. When the concentration of the coating solution is increased with an object to be compensatory for the uneven coating, the coating amount is necessarily increased so much. On the contrary, the modified polyvinyl alcohol as defined above gives an aqueous solution of a relatively high viscosity even at a low concentration so that the solution can be applied to any highly water-absorptive surfaces without unduly increasing the coating amount.

The modified polyvinyl alcohol used in the inventive priming composition must contain the monomer units having a side chain of the long-chained alkyl ether —OR in a mole fraction of 0.0001 to 0.02 on an average. In other words, from 0.01% to 2% of the monomer units on an average should be the alkyl ether-modified monomer units. When the mole fraction is smaller than 0.01%, the modified polyvinyl alcohol is no better than an ordinary unmodified polyvinyl alcohol as a component in the priming composition while a modified polyvinyl alcohol having a mole fraction of the modified units larger than 2% is hardly soluble in water so that no satisfactory aqueous priming composition can be prepared.

The alkyl group bonded to the polymer chain through the ether linkage should have at least 6 carbon atoms or, preferably carbon atoms as large as possible in number and desirably selected from lauryl, cetyl and stearyl groups having 12, 16 and 18 carbon atoms, respectively. When the alkyl group has 5 or a smaller number of carbon atoms, the effectiveness of the priming composition is greatly reduced.

The modified polyvinyl alcohol as defined above is prepared according to a method known in the art such as the saponification of a copolymerizate of vinyl acetate and a corresponding alkylvinyl ether or the reaction of a partially or fully saponified polyvinyl alcohol with a corresponding alkyl chloride.

The mole fraction x for the monomer units of the formula (I) corresponds to the degree of saponification and it should be at least 0.60 or, preferably, at least 0.75. This is because a polyvinyl alcohol having a degree of saponification smaller than 60% is no longer soluble in water so that the desired aqueous priming composition cannot be prepared.

The average degree of polymerization is not particularly limitative but usually it is in the range of 1000 to 2000 although a polymer having a lower degree of polymerization may be used.

The inventive priming composition is obtained by merely dissolving the above described modified polyvinyl alcohol in water, optionally, containing a small volume of a water-miscible organic solvent such as an alcohol. The concentration of the polymer in the aqueous solution is usually in the range from 0.5% to 10% by weight and it should be determined in consideration of the viscosity of the solution to give good workability and the condition of the surface of the concrete or mortar base.

As is mentioned before, the inventive aqueous priming composition may contain an aqueous emulsion of a synthetic resin as one of the base components in combination with the above described modified polyvinyl alcohol. Blending of a resin emulsion in the inventive priming composition is effective in improving the workability of the composition in coating on the surface of the concrete or mortar base as well as in increasing the drying velocity in addition to the less expensiveness. When a disadvantage of exfoliation of the overcoat layer by heat, such as in a fire hazard, is taken into consideration, it is recommended that the amount of the resin emulsion as solid does not exceed the amount of the modified polyvinyl alcohol due to the lower softening point of the former than the latter.

The synthetic resin emulsions suitable as the second base component in the inventive priming composition are exemplified by the aqueous emulsions of a polyvinyl acetate, a copolymer of vinyl acetate and an ester of an unsaturated carboxylic acid such as butyl acrylate, copolymer of vinyl acetate and ethylene, ternary copolymer of vinyl acetate, ethylene and an ester of an unsaturated carboxylic acid, ternary copolymer of vinyl acetate, ethylene and a vinyl ester of a tertiary carboxylic acid and the like.

The aqueous emulsions of the above named polymers and copolymers are themselves effective as an adhesive agent for a cement mortar base and exhibit a waterproofing effect when partially hydrolyzed by the alkalinity of the mortar base to be swellable with water. In particular, the instability of the resin emulsion is no longer a problem in the combined use of the resin emulsion with the modified polyvinyl alcohol since the latter acts as a specifically effective protective colloid for the former preventing the coating film on the base surface from decreased uniformity in drying. The above mentioned effect as a protective colloid is very specific in the modified polyvinyl alcohol and obtained only insufficiently with conventional water-soluble polymeric materials known as a protective colloid such as an ordinary polyvinyl alcohol, methylcellulose, hydroxyethylcellulose, polyacrylic acid and the like as well as with various kinds of surface active agents.

When the resin in the aqueous emulsion as the second base component in the inventive priming composition is a copolymer with vinyl acetate as one of the monomeric constituents, it is preferable that the content of the vinyl acetate in the polymer be relatively high. For example, a copolymer of vinyl acetate and an ester of an carboxylic acid should contain preferably at least 50% by weight of vinyl acetate, a copolymer of vinyl acetate and ethylene should contain preferably at least 60% or, more preferably, from 70 to 90% by weight of vinyl acetate and a ternary copolymer of vinyl acetate, ethylene and an ester of an unsaturated carboxylic acid should contain 30% or less, more preferably, 5 to 25% by weight of ethylene and 30% or less or, more preferably, from 5 to 25% by weight of the ester.

The esters of unsaturated carboxylic acids suitable as the comonomeric constituent in the synthetic resin emulsion are exemplified by acrylic acid esters such as methyl acrylate, ethyl acrylate, propyl acrylate, butyl acrylate, hexyl acrylate, octyl acrylate and hydroxyethyl acrylate, methacrylic acid esters such as methyl methacrylate, ethyl methacrylate, butyl methacrylate and hydroxyethyl methacrylate, maleic acid esters such as methyl maleate, ethyl maleate, butyl maleate, cyclohexyl maleate, dimethyl maleate, diethyl maleate and dibutyl maleate and fumaric acid esters such as methyl fumarate, ethyl fumarate, butyl fumarate, cyclohexyl fumarate, dimethyl fumarate, diethyl fumarate and dibutyl fumarate.

The vinyl esters of tertiary carboxylic acid as a comonomeric constituent in the synthetic resin emulsion are exemplified by vinyl trimethylacetate and vinyl triethylacetate. Particularly suitable as the vinyl ester of this class is a commercial product known by a tradename of VeoVa (a product by Shell Chemical Co.) which is a tertiary carboxylic acid having from 8 to 11 carbon atoms in a molecule. This class of the copolymer should contain preferably 30% by weight or less or, more preferably, from 5 to 25% by weight of ethylene and 25% by weight or less or, more preferably, from 5 to 20% by weight of the vinyl ester.

The blending proportion of the modified polyvinyl alcohol and the synthetic resin emulsion to form the base component of the inventive priming composition may range widely depending on diversified needs. It is essential, however, that the amount of the modified polyvinyl alcohol is at least 1% by weight of the base component, i.e. the total amount of the modified polyvinyl alcohol and the synthetic resin emulsion as solid in order that a synergistic effects are exhibited by the combination thereof in both adhesion strength of the finishing overcoat and the waterproofing effect.

Blending of the modified polyvinyl alcohol and the synthetic resin emulsion may be carried out in several different ways. For example, the modified polyvinyl alcohol is first dissolved in water to give an aqueous solution, which is then blended with the aqueous resin emulsion. Alternatively, the modified polyvinyl alcohol is used as a protective colloind in combination with a surface active agent in the emulsion polymerization to prepare the synthetic resin emulsion so that the resin emulsion as prepared already contains the modified polyvinyl alcohol. These methods also can be combined.

When a synthetic resin emulsion is combined with the modified polyvinyl alcohol as a base component of the inventive composition, the solid content of the inventive priming composition can considerably be higher than with the modified polyvinyl alcohol alone and may range up to 60% by weight as the total content of the modified polyvinyl alcohol and the resin emulsion as solid taking the advantage that a resin emulsion has a low viscosity for its high solid content. It is of course that, in a composition, in particular, containing the other optional additive ingredients as undermentioned, the concentrations of these components should be determined in view of the results of testing experimentation to obtain best workability as well as the desired priming and waterproofing effects.

The inventive priming composition may contain other conventional additive ingredients including protective colloids such as ordinary polyvinyl alcohols, methylcellulose, hydroxyethylcellulose and the like, surface active agents, defoaming agents, penetrating agents, wetting agents, plasticizers, film-forming aids, softening agents, water-retaining agents, antifreeze agents, waterproofing agents, antiseptics, antifouling agents, thickening agents, coloring agents, flavorings, extenders and fillers according to need and in amounts not to unduly impair the desired effects of the inventive composition.

The inventive priming composition, when appropriately prepared according to the above description, can readily be applied to the surface of any kinds of concrete or mortar base by a known coating method such as brush coating, trowel coating, roller coating and spraying according to the consistency of the composition and the surface condition of the base. The coating amount is usually in the range from 1 to 50 g/m$^2$ or, preferably, from 5 to 20 g/m$^2$ as solid and, when the composition contains a large amount of the resin emulsion, the coating amount can be relatively large accordingly while a relatively small coating amount may be sufficient when the priming composition contains no or only a small amount of the resin emulsion.

The inventive priming composition is applicable not only to ordinary concrete or mortar base of in-place casting but also to any kinds of precast bodies based on a hydraulic cement such as slabs of autoclaved lightweight concrete, Hume concrete pipes and other precast concrete blocks and the thus primed surface of the base can be finished by providing an overcoat with a cement mortar or paste to be imparted with excellent adhesion between the overcoat and the base as well as excellent waterproofing effect.

The priming composition, the method of priming therewith and the effectiveness of the invention are described in further detail by way of examples with several comparative examples.

EXAMPLE

Three kinds of stearyl- or lauryl-modified polyvinyl alcohols A, B and C were prepared and a commercial product of an ordinary polyvinyl alcohol D was procured. The characterization of these modified and unmodified polyvinyl alcohols are as given in Table 1 below.

TABLE 1

| Polyvinyl alcohol | Average degree of polymerization | x | y | Modifying group R | z |
|---|---|---|---|---|---|
| A | 1400 | 0.995 | 0.004 | Stearyl | 0.001 |
| B | 1400 | 0.875 | 0.124 | Stearyl | 0.001 |
| C | 1750 | 0.830 | 0.168 | Lauryl | 0.002 |
| D | 1750 | 0.987 | 0.013 | None | |

In parallel, 7 kinds of aqueous emulsions of synthetic resins P, Q, R, S, T, U and V were prepared or procured. Characterization of these resin emulsions are as given below in Table 2.

TABLE 2

| Resin emulsion | Monomeric constituents (contents in % by weight) | | | Solid content, % | Viscosity, centipoise |
|---|---|---|---|---|---|
| P | Vinyl acetate (100) | — | — | 50.5 | 10,220 |
| Q | Vinyl acetate (70) | Octyl acrylate (30) | — | 50.2 | 2,200 |
| R | Vinyl acetate (80.5) | Ethylene (19.5) | — | 55.2 | 1,800 |
| S | Vinyl acetate (91.3) | Ethylene (8.7) | — | 55.6 | 1,600 |
| T | Vinyl acetate (77) | Ethylene (13) | Butyl acrylate (10) | 54.8 | 1,300 |
| U | Vinyl acetate (75) | Ethylene (18) | Butyl maleate (7) | 55.0 | 2,010 |
| V | Vinyl acetate (75) | Ethylene (10) | VeoVa (15) | 55.8 | 1,200 |

Aqueous priming compositions were prepared by dissolving either one of the modified polyvinyl alcohols in water to give an aqueous solution containing 3% by weight of the polymer or by blending the solution with either one of the resin emulsions to give the proportions of the polyvinyl alcohol and the emulsion calculated as solid as indicated in the following Table 3.

The priming compositions prepared as above were tested for the effect on the adhesive bonding strength of an overcoat finishing with a cement mortar applied on to a concrete base as well as for the waterproofing effect when the priming composition was applied to a block shaped with a cement mortar. The testing procedures were as follows.

(I) Measurement of adhesive bonding strength

A concrete block for sidewalk pavement as specified in JIS A 5304 was washed and seasoned for 10 days in a room at 20° C. with a relative humidity of 60%. The priming composition was applied on to the surface of the block in a coating amount as indicated in the table and dried for 5 hours in the same room as above and the thus treated surface was provided with a cement mortar finishing of 10 mm thickness with a cement mortar prepared in a sand/cement ratio of 3.0 and flow of 170 by use of a river sand and subjected to curing in air for 4 weeks under the same conditions as above. The measurement of the adhesive bonding strength was undertaken according to JIS A 6915 to give the results shown in Table 3.

(II) Measurement of the water-permeability

The cement mortar prepared with the same formulation as above was shaped in a mold into a block of a thickness of 40 mm and a diameter of 150 mm and taken out of the mold after 48 hours followed by curing for 10 days under the same conditions as above. One of the flat surfaces of the block was coated with the priming composition and dried for 24 hours under the same conditions. The water permeation test was conducted according to the method specified in JIS A 1404 and the results were expressed by the relative value taking the value for an untreated block as 1.00. The results are shown in Table 3.

TABLE 3

| | Formulation of priming composition | | | | | |
|---|---|---|---|---|---|---|
| Exp. No. | Polyvinyl alcohol (% by weight) | Resin emulsion (% by weight as solid) | Solid content, % | Coating amount, g/m² as solid | Adhesive bonding strength, kg/cm² | Relative water permeability |
| 1 | A (100) | — | 3 | 5 | 13.2 | 0.25 |
| 2 | A (100) | — | 3 | 10 | 14.1 | 0.19 |
| 3 | B (100) | — | 3 | 5 | 13.7 | 0.27 |
| 4 | C (100) | — | 3 | 5 | 12.6 | 0.25 |
| 5 | B (70) | P (30) | 4.2 | 10 | 14.0 | 0.18 |
| 6 | B (85) | R (15) | 3.5 | 5 | 13.5 | 0.27 |
| 7 | B (60) | R (40) | 4.8 | 10 | 14.3 | 0.20 |
| 8 | A (70) | S (30) | 4.4 | 10 | 14.0 | 0.20 |
| 9 | C (70) | T (30) | 4.4 | 10 | 14.2 | 0.19 |
| 10 | B (70) | U (30) | 4.4 | 10 | 14.4 | 0.16 |
| 11 | C (70) | V (30) | 4.4 | 10 | 13.6 | 0.21 |
| 12 | A (70) | Q (30) | 4.4 | 10 | 14.2 | 0.18 |
| 13 | A (9.1) | P (90.9) | 15 | 10 | 10.4 | 0.23 |
| 14 | B (9.1) | P (90.9) | 15 | 10 | 12.1 | 0.20 |
| 15 | C (9.1) | P (90.9) | 15 | 10 | 11.7 | 0.18 |
| 16 | A (9.1) | Q (90.9) | 15 | 10 | 10.6 | 0.19 |
| 17 | C (23.1) | Q (76.9) | 15 | 10 | 12.1 | 0.16 |
| 18 | B (33.3) | R (66.7) | 15 | 10 | 13.5 | 0.15 |
| 19 | B (4.8) | R (95.2) | 15 | 10 | 14.8 | 0.13 |
| 20 | B (2.0) | R (98.0) | 15 | 10 | 12.7 | 0.14 |
| 21 | A (9.1) | S (90.9) | 15 | 10 | 11.8 | 0.18 |
| 22 | A (9.1) | T (90.9) | 15 | 10 | 14.6 | 0.15 |
| 23 | B (4.8) | T (95.2) | 15 | 10 | 15.0 | 0.13 |
| 24 | B (4.8) | U (95.2) | 15 | 10 | 14.3 | 0.12 |
| 25 | B (4.8) | V (95.2) | 15 | 10 | 14.9 | 0.14 |
| 26 | B (4.8) | R (95.2) | 15 | 10 | 15.7 | 0.12 |

In all of the experiments summarized in Table 3, the priming composition was converted to a uniform coating film as dried on the surface of the concrete block. Further, the adhesive bonding between the surface of the concrete base and the overcoat layer of the cement mortar was so complete that the mortar layer was always became broken by the tensile test for the adhesive bonding strength instead of being separated at the interface.

For comparison, similar tests to the above were conducted by use of the polyvinyl alcohol D and the results are summarized in Table 4 below. In the tensile test for the adhesive bonding strength, in this case, the mortar layer was not always broken but the mortar layer sometimes came off from the concrete base as is indicated in the column of "Position of breakage." It was noted in this series of experiments that the coating film formed by drying of the priming composition on the concrete base was not uniform.

Table 4 also includes the results of the experiments carried out with the resin emulsion alone without the addition of any polyvinyl alcohol (Experiments No. 38 to No. 46) and the results obtained without the treatment with a priming composition (Experiment No. 47).

TABLE 4

| | Formulation of priming composition | | | | | | |
|---|---|---|---|---|---|---|---|
| Exp. No. | Polyvinyl alcohol (% by weight) | Resin emulsion (% by weight as solid) | Solid content, % | Coating amount, g/m² as solid | Adhesive bonding strength, kg/cm² | Relative water permeability | Position of breakage (*) |
| 26 | D (100) | — | 3 | 5 | 4.3 | 0.81 | c |
| 27 | D (100) | — | 3 | 10 | 6.3 | 0.68 | b |
| 28 | D (100) | — | 3 | 20 | 8.4 | 0.54 | b |
| 29 | D (85) | R (15) | 3.5 | 5 | 3.8 | 0.70 | c |
| 30 | D (60) | R (40) | 4.8 | 10 | 4.1 | 0.65 | c |
| 31 | D (60) | R (40) | 4.8 | 20 | 4.8 | 0.61 | c |
| 32 | D (70) | U (30) | 4.4 | 10 | 4.0 | 0.63 | c |
| 33 | D (70) | U (30) | 4.4 | 20 | 5.1 | 0.59 | b |

TABLE 4-continued

| Exp. No. | Formulation of priming composition | | Solid content, % | Coating amount, g/m² as solid | Adhesive bonding strength, kg/cm² | Relative water permeability | Position of breakage (*) |
| --- | --- | --- | --- | --- | --- | --- | --- |
| | Polyvinyl alcohol (% by weight) | Resin emulsion (% by weight as solid) | | | | | |
| 34 | D (23.1) | Q (76.9) | 15 | 10 | 3.8 | 0.67 | c |
| 35 | D (33.3) | R (66.7) | 15 | 10 | 4.2 | 0.68 | c |
| 36 | D (4.8) | R (95.2) | 15 | 10 | 3.9 | 0.65 | c |
| 37 | D (9.1) | T (90.9) | 15 | 30 | 10.7 | 0.52 | a |
| 38 | — | P (100) | 15 | 10 | 3.3 | 0.72 | c |
| 39 | — | R (100) | 15 | 10 | 4.0 | 0.65 | c |
| 40 | — | R (100) | 15 | 20 | 8.0 | 0.60 | b |
| 41 | — | Q (100) | 15 | 10 | 3.2 | 0.70 | c |
| 42 | — | R (100) | 15 | 30 | 10.5 | 0.56 | a |
| 43 | — | S (100) | 15 | 10 | 3.8 | 0.69 | c |
| 44 | — | T (100) | 15 | 10 | 4.3 | 0.62 | c |
| 45 | — | U (100) | 15 | 10 | 4.9 | 0.58 | c |
| 46 | — | V (100) | 15 | 10 | 4.8 | 0.60 | c |
| 47 | — | — | — | — | 3.0 | (1.00) | c |

(*) a: Breakage took place within the mortar layer.
b: Breakage took place mostly at the interface but partly within the mortar layer.
c: Breakage took place at the interface.

What is claimed is:

1. A method for priming the surface of a base of cement, mortar or concrete which comprises coating the surface with an aqueous priming composition containing, as dissolved in an aqueous medium, a modified polyvinyl alcohol containing, in the molecular chain thereof, monomer units expressed by the formulas

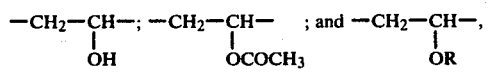

in mole fractions x, y and z, respectively, in which R is an alkyl group having at least 6 carbon atoms, x is a positive number not smaller than 0.60, y is a positive number not exceeding 0.40 and z is a number in the range from 0.0001 to 0.02 inclusive with the proviso that x+y+z is substantially equal to 1, followed by drying.

2. The method as claimed in claim 1 wherein the amount of coating with the priming composition is in the range from 1 to 50 g/m² as dried.

3. The method as claimed in claim 1 wherein the aqueous priming composition further contains, as dispersed in the aqueous medium, an emulsion of a synthetic resin mainly composed of vinyl acetate.

* * * * *